United States Patent
Bonnette et al.

(10) Patent No.: US 12,486,385 B2
(45) Date of Patent: Dec. 2, 2025

(54) TIRE INCORPORATING A RUBBER COMPOSITION INCLUDING A SPECIFIC HYDROCARBON RESIN

(71) Applicant: COMPAGNIE GENERALE DES ETABLISSEMENTS MICHELIN, Clermont-Ferrand (FR)

(72) Inventors: Fabien Bonnette, Clermont-Ferrand (FR); Laurent Copey, Clermont-Ferrand (FR); Benoit De Gaudemaris, Clermont-Ferrand (FR); Olivier J. F. Georjon, Uccle (BE); Derek W. Thurman, Friendswood, TX (US); Ranjan Tripathy, Sugar Land, TX (US); Alain Hut, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 985 days.

(21) Appl. No.: 17/629,668

(22) PCT Filed: Jul. 10, 2020

(86) PCT No.: PCT/EP2020/069497
§ 371 (c)(1),
(2) Date: Jan. 24, 2022

(87) PCT Pub. No.: WO2021/018548
PCT Pub. Date: Feb. 4, 2021

(65) Prior Publication Data
US 2022/0259415 A1 Aug. 18, 2022

(30) Foreign Application Priority Data
Jul. 26, 2019 (FR) ...................................... 1908541

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01)

(58) Field of Classification Search
CPC .......... C08L 9/06; B60C 1/0016; B60C 1/00; C08K 13/02; C08K 3/04; C08K 3/22;
(Continued)

(56) References Cited

U.S. PATENT DOCUMENTS

| 4,398,582 A | 8/1983 | Yuto et al. |
| 5,171,793 A | 12/1992 | Johnson et al. |

(Continued)

FOREIGN PATENT DOCUMENTS

| EP | 0501227 A1 | 9/1992 |
| EP | 0735088 A1 | 10/1996 |

(Continued)

OTHER PUBLICATIONS

International Search Report dated Oct. 6, 2020, in corresponding PCT/EP2020/069497 (2 pages).
(Continued)

*Primary Examiner* — Doris L Lee
(74) *Attorney, Agent, or Firm* — VENABLE LLP

(57) ABSTRACT

Described herein are tires comprising a rubber composition based on at least an elastomer matrix comprising from 50 to 100 phr of one or more copolymers of butadiene and of vinylaromatic monomer, having a content of vinylaromatic units of between 0 and 5% by weight and a Tg within a range extending from −110° C. to −70° C.; and a hydrocarbon resin, wherein the hydrocarbon resin is based on a cyclic monomer selected from the group consisting of a distillation cut from a petroleum refinery stream, and/or $C_4$, $C_5$ or $C_6$
(Continued)

cyclic olefins and mixtures thereof, and wherein the hydrocarbon resin has a content of aromatic protons (H Ar, expressed in mol %), a glass transition temperature (Tg, expressed in ° C.), and a number average molecular weight (Mn, expressed in g/mol) that are represented by (1) H Ar>6 mol %, (2) Tg≥95−2.2*(H Ar), and (3) Tg≥−53+(0.265*Mn).

15 Claims, 2 Drawing Sheets

(58) Field of Classification Search
 CPC .......... C08K 3/36; C08K 5/18; C08K 5/3437; C08K 5/47; C08K 5/548; C08K 2003/2296
 See application file for complete search history.

(56) References Cited

U.S. PATENT DOCUMENTS

| | | |
|---|---|---|
| 5,227,425 A | 7/1993 | Rauline |
| 5,552,489 A | 9/1996 | Merrill et al. |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,218,588 B1 | 4/2001 | Dommisse et al. |
| 6,420,488 B1 | 7/2002 | Penot |
| 6,433,104 B1 | 8/2002 | Macedo et al. |
| 6,503,973 B2 | 1/2003 | Robert et al. |
| 6,536,492 B2 | 3/2003 | Vasseur |
| 6,774,255 B1 | 8/2004 | Tardivat et al. |
| 6,815,473 B2 | 11/2004 | Robert et al. |
| 6,825,291 B2 | 11/2004 | Klosiewicz et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,488,768 B2 | 2/2009 | Tardivat et al. |
| 7,491,767 B2 | 2/2009 | Durel et al. |
| 8,492,475 B2 | 7/2013 | Araujo Da Silva et al. |
| 8,735,500 B2 | 5/2014 | Barbee et al. |
| 9,010,393 B2 | 4/2015 | Araujo Da Silva et al. |
| 9,856,368 B2 | 1/2018 | Herzog et al. |
| 9,909,004 B2 | 3/2018 | Blok et al. |
| 10,689,507 B2 | 6/2020 | Abad |
| 10,889,147 B2 | 1/2021 | Chatard et al. |
| 11,203,680 B2 | 12/2021 | DeGaudemaris et al. |
| 11,220,591 B2 | 1/2022 | DeGaudemaris et al. |
| 11,225,567 B2 | 1/2022 | Cabioch et al. |
| 11,352,484 B2 | 6/2022 | Copey et al. |
| 11,365,308 B2 | 6/2022 | DeGaudemaris et al. |
| 11,492,465 B2 | 11/2022 | DeGaudemaris et al. |
| 2001/0034389 A1 | 10/2001 | Vasseur |
| 2004/0051210 A1 | 3/2004 | Tardivat et al. |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2005/0148718 A1 | 7/2005 | Ishida et al. |
| 2006/0089445 A1 | 4/2006 | Gandon-pain |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2010/0204359 A1 | 8/2010 | Robert et al. |
| 2010/0216939 A1 | 8/2010 | Zhao et al. |
| 2011/0152458 A1 | 6/2011 | Araujo Da Silva et al. |
| 2013/0087953 A1 | 4/2013 | Rodgers et al. |
| 2013/0196085 A1 | 8/2013 | Voge et al. |
| 2015/0065655 A1 | 3/2015 | Blok et al. |
| 2015/0283854 A1 | 10/2015 | Saintigny et al. |
| 2016/0194485 A1 | 7/2016 | Herzog et al. |
| 2017/0198122 A1 | 7/2017 | Rodgers et al. |
| 2018/0171124 A1 | 6/2018 | Ingratta et al. |
| 2018/0186978 A1 | 7/2018 | Abad |
| 2018/0284085 A1 | 10/2018 | Arigo et al. |
| 2018/0340055 A1 | 11/2018 | DeGaudemaris et al. |
| 2019/0077887 A1 | 3/2019 | Dire et al. |
| 2019/0367707 A1* | 12/2019 | De Gaudemaris ........ B60C 1/00 |
| 2020/0131347 A1 | 4/2020 | Cabioch et al. |
| 2020/0223259 A1 | 7/2020 | Hellot et al. |
| 2020/0325312 A1 | 10/2020 | Abrunie et al. |
| 2020/0385550 A1 | 12/2020 | Cabioch et al. |
| 2020/0392314 A1 | 12/2020 | DeGaudemaris et al. |
| 2022/0227975 A1 | 7/2022 | Bonnette et al. |
| 2022/0251349 A1 | 8/2022 | Bonnette et al. |
| 2022/0251350 A1 | 8/2022 | Bonnette et al. |
| 2022/0363875 A1 | 11/2022 | DeGaudemaris et al. |

FOREIGN PATENT DOCUMENTS

| | | | |
|---|---|---|---|
| EP | 0810258 A1 | 12/1997 | |
| EP | 0890607 B1 | 3/2003 | |
| EP | 1127909 B1 | 3/2005 | |
| FR | 2740778 A1 | 5/1997 | |
| FR | 2765882 A1 | 1/1999 | |
| WO | 91/13106 A1 | 5/1991 | |
| WO | 197/36724 A2 | 10/1997 | |
| WO | 99/16600 A1 | 4/1999 | |
| WO | 00/05300 A1 | 2/2000 | |
| WO | 00/05301 A1 | 2/2000 | |
| WO | 01/92402 A1 | 12/2001 | |
| WO | 02/30939 A1 | 4/2002 | |
| WO | p2/31041 A1 | 4/2002 | |
| WO | 02/083782 A1 | 10/2002 | |
| WO | 03/002648 A1 | 1/2003 | |
| WO | 03/002649 A1 | 1/2003 | |
| WO | 03/016387 A1 | 2/2003 | |
| WO | 2004/096865 A2 | 11/2004 | |
| WO | 2006/069792 A1 | 7/2006 | |
| WO | 2006/069793 A1 | 7/2006 | |
| WO | 2006/125532 A1 | 11/2006 | |
| WO | 2006/125533 A1 | 11/2006 | |
| WO | 2006/125534 A1 | 11/2006 | |
| WO | 2008/003434 A1 | 1/2008 | |
| WO | 2008/003435 A1 | 1/2008 | |
| WO | 2008/141702 A1 | 11/2008 | |
| WO | 2009/000750 A1 | 12/2008 | |
| WO | 2009/000752 A1 | 12/2008 | |
| WO | 2012/050658 A1 | 4/2012 | |
| WO | 2013/176712 A1 | 11/2013 | |
| WO | 2015/043902 A1 | 4/2015 | |
| WO | WO-2016043851 A1 * | 3/2016 | .......... B60C 1/0008 |
| WO | 2016/202968 A1 | 12/2016 | |
| WO | 2017/060395 A1 | 4/2017 | |
| WO | 2017/064235 A1 | 4/2017 | |
| WO | 2017/168099 A1 | 10/2017 | |
| WO | WO-2018115621 A1 * | 6/2018 | ............... B60C 1/00 |
| WO | 2019/002764 A1 | 1/2019 | |
| WO | 2019/002766 A1 | 1/2019 | |
| WO | 2019/115954 A1 | 6/2019 | |
| WO | 2019/115955 A1 | 6/2019 | |

OTHER PUBLICATIONS

T. Sun, et al., "Effect of Short Chain Branching on the Coil Dimensions of Polyolefins in Dilute Solution", Macromolecules 2001, 34, 6812-6820.

Kirk-Othmer Encyclopedia of Chemical Terminology, 4th ed., Wiley-Interscience, vol. 13, pp. 717-744 (1995).

* cited by examiner

TIRE INCORPORATING A RUBBER COMPOSITION INCLUDING A SPECIFIC HYDROCARBON RESIN

BACKGROUND

The present invention relates to tires comprising rubber compositions comprising a specific hydrocarbon resin.

It is known from the prior art that elastomers having a low glass transition temperature ("Tg") enable an improvement in terms of abrasion performance (WO 2015/043902). These low Tg elastomers, however, have poor compatibility with the hydrocarbon-based plasticizing resins typically used in tires, rendering them unsuitable for easy and optimal use in compositions for tires which may have the best compromise between performance properties that are difficult to reconcile simultaneously (namely wear resistance and grip, which must be high, and rolling resistance, which must be low in order to minimize fuel consumption).

Thus, it is currently beneficial for tire manufacturers to find formulas which make it possible to improve the balance between all of these performance properties, especially by improving the compatibility of the elastomers with the hydrocarbon-based plasticizing resins.

Document WO2013/176712 describes various resins of cyclopentadiene/dicyclopentadiene/methylcyclopentadiene type, having specific weights and softening points. In this document, these resins are used in the disclosed examples to improve wet grip.

Documents WO2017/064235 and WO2017/168099 also describe various resins of cyclopentadiene/dicyclopentadiene/methylcyclopentadiene type, and their use in tires having improved having high grip and low rolling resistance.

At present, the Applicants have shown that a particular composition comprising a specific hydrocarbon-based resin makes it possible to obtain tires with improved road behavior at various temperatures. The invention relates to such tires, as further describes below.

SUMMARY

Described herein are tires comprising a rubber composition based on at least an elastomer matrix and a hydrocarbon resin, wherein said hydrocarbon resin is based on a cyclic monomer selected from the group consisting of a distillation cut from a petroleum refinery stream, and/or $C_4$, $C_5$ or $C_6$ cyclic olefins and mixtures thereof, and wherein the hydrocarbon resin has a content of aromatic protons (H Ar, expressed in mol %), a glass transition temperature (Tg, is expressed in ° C.), and a number average molecular weight (Mn, expressed in g/mol) that are represented by (1) H Ar>6 mol %, (2) Tg≥95−2.2*(H Ar), and (3) Tg≥−53+ (0.265*Mn).

The tire according to the invention will be chosen from, without limitation, the tires intended to equip a two-wheeled vehicle, a passenger vehicle, or else a "heavy-duty" vehicle (that is to say, underground train, bus, off-road vehicles, heavy road transport vehicles, such as lorries, tractors or trailers), or else aircraft, construction equipment, heavy agricultural vehicles or handling vehicles

DETAILED DESCRIPTION OF THE INVENTION

Figure 1:
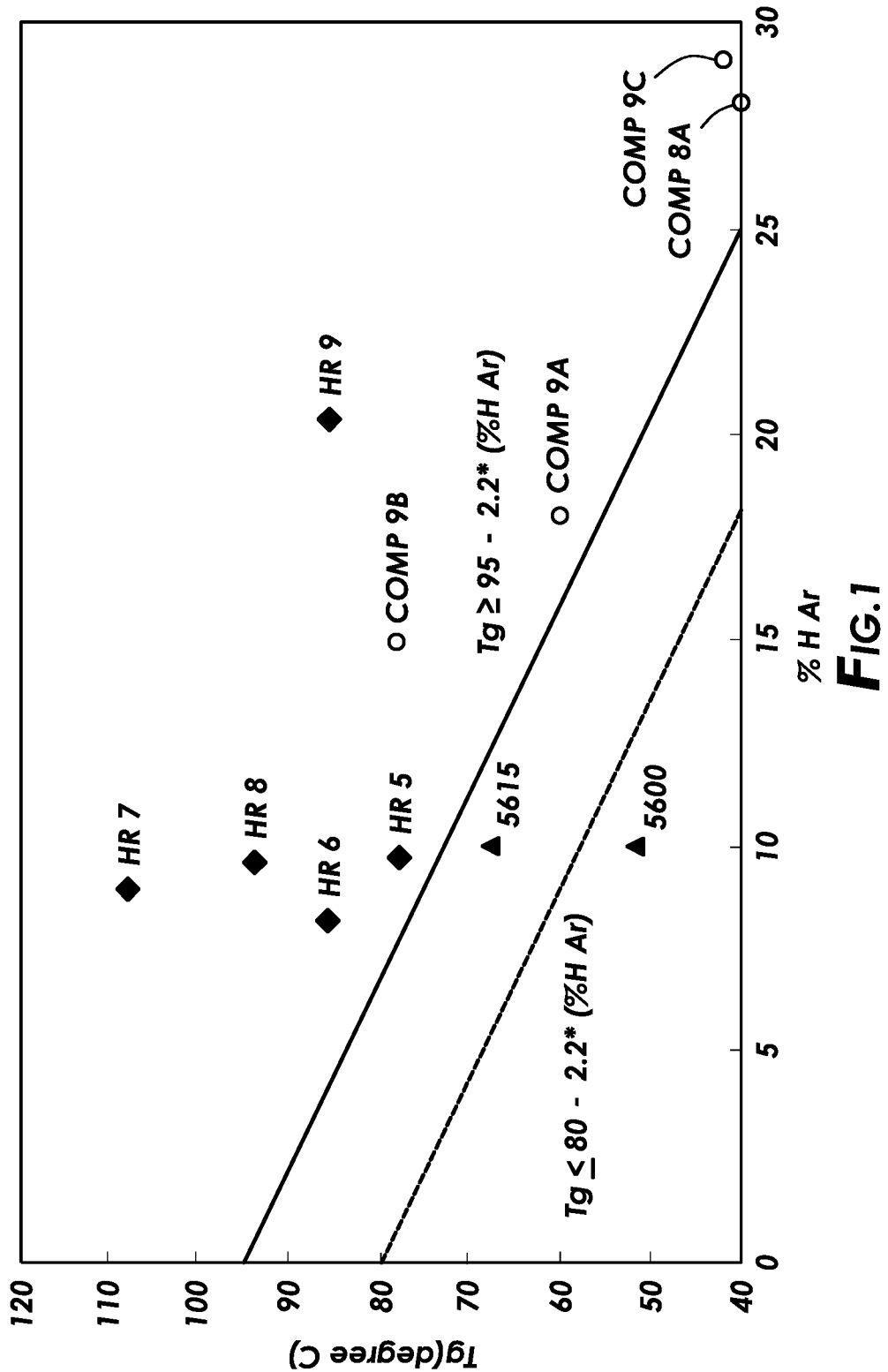
FIG. 1 is graph of the Tg and H Ar relationship of the present hydrocarbon resin, comparative resin and prior art elastomeric compositions.

Provided herein are tires comprising a rubber composition based on at least an elastomer matrix comprising from 50 to 100 phr of one or more copolymers of butadiene and of vinylaromatic monomer, having a content of vinylaromatic units of between 0 and 5% by weight and a Tg within a range extending from −110° C. to −70° C.; and a hydrocarbon resin, wherein said hydrocarbon resin is based on a cyclic monomer selected from the group consisting of a distillation cut from a petroleum refinery stream, and/or $C_4$, $C_5$ or $C_6$ cyclic olefins and mixtures thereof, and wherein the hydrocarbon resin has a content of aromatic protons (H Ar, expressed in mol %), a glass transition temperature (Tg, is expressed in ° C.), and a number average molecular weight (Mn, expressed in g/mol) that are represented by (1) H Ar>6 mol %, (2) Tg≥95−2.2*(H Ar), and (3) Tg≥−53+ (0.265*Mn).

Definitions

For the purposes of this disclosure, the following definitions will apply, unless otherwise stated:

As used herein, the singular form of "a," "an," and "the" include plural referents unless otherwise specified.

The term "predominant compound" refers to a compound that is predominant among the compounds of the same type in a composition. For example, the predominant compound is one that represents the greatest amount by weight among the compounds of the same type in a composition. Thus, for example, a predominant polymer is the polymer representing the greatest weight relative to the total weight of the polymers in the composition.

The term, "predominant unit" refers to a unit within the same compound (or polymer) that is predominant among the units forming the compound (or polymer) and which represents the greatest fraction by weight among the units forming the compound (or polymer). For example, the hydrocarbon resin can comprise predominant units of cyclopentadiene where the cyclopentadiene units represent the greatest amount by weight among all of the units comprising the resin. Similarly, as described herein, the hydrocarbon resin can comprise predominant units selected from the group of cyclopentadiene, dicyclopentadiene, methylcyclopentadiene and mixtures thereof where the sum of the units selected from the group of cyclopentadiene, dicyclopentadiene, methylcyclopentadiene and mixtures thereof represents the greatest number by weight among all of the units.

The term, a "predominant monomer" refers to a monomer which represents the greatest fraction by weight in the total polymer. Conversely, a "minor" monomer is a monomer which does not represent the greatest molar fraction in the polymer.

The phrase "composition based on" refers to a composition comprising the mixture and/or the product of the in situ reaction of the various base constituents used, some of these constituents being able to react and/or being intended to react with one another, at least partially, during the various phases of manufacture of the composition or during the subsequent curing, which may modify the composition as it is prepared at the start. Thus, compositions described below can be different in the non-crosslinked state and in the crosslinked state.

Unless expressly indicated otherwise, all the percentages (%) shown are percentages by weight ("wt. %"). Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

Rubber Compositions

The tire of the invention comprises a rubber composition based on at least a specific elastomer matrix and a specific hydrocarbon resin, as described below. Said rubber composition may also comprise various optional ingredients, well known by the person skilled in the art. Some of them are also described below.

Hydrocarbon Resin

The hydrocarbon resin is based on a cyclic monomer selected from the group consisting of a distillation cut from a petroleum refinery stream, and/or $C_4$, $C_5$ or $C_6$ cyclic olefins and mixtures thereof, and wherein the hydrocarbon resin has a content of aromatic protons (H Ar, expressed in mol %), a glass transition temperature (Tg, is expressed in ° C.), and a number average molecular weight (Mn, expressed in g/mol) that are represented by (1) H Ar>6 mol %, (2) Tg≥95−2.2*(H Ar), and (3) Tg≥−53+(0.265*Mn).

The phrase "hydrocarbon resin based on" refers to the polymer resulting from the polymerization of the proposed monomers, i.e.: cyclic monomers and/or aromatic monomers, such monomers after the polymerization reaction being changed to their corresponding units in the polymer. Such polymerization of cyclic monomers and/or aromatic monomers would result in hydrocarbon resins comprising the corresponding cyclic units and/or aromatic units.

As used herein, the term, "cyclic monomer" refers to a distillation cut and/or synthetic mixture of $C_5$ and $C_6$ cyclic olefins, diolefins, dimers, codimers, and trimers. More specifically, cyclic monomers include, but are not limited to, cyclopentene, cyclopentadiene ("CPD"), dicyclopentadiene ("DCPD"), cyclohexene, 1,3-cyclohexadiene, 1,4-cyclohexadiene, methylcyclopentadiene ("MCPD"), di(methylcyclopentadiene) ("MCPD dimer"), and codimers of CPD and/or MCPD with $C_4$ cyclics such as butadienes, $C_5$ cyclics such as piperylene. An exemplary cyclic monomer is cyclopentadiene. Optionally, the cyclic monomers can be substituted. The dicyclopentadiene can be in either the endo or exo form.

Substituted cyclic monomers include cyclopentadienes and dicyclopentadienes substituted with a $C_1$ to $C_{40}$ linear, branched, or cyclic alkyl group. In an aspect the substituted cyclic monomer can have one or more methyl groups. In an aspect, the cyclic monomers are selected from the group of: cyclopentadiene, cyclopentadiene dimer, cyclopentadiene-$C_4$ codimer, cyclopentadiene-$C_5$ codimer, cyclopentadiene-methylcyclopentadiene codimer, methylcyclopentadiene-$C_4$ codimer, methylcyclopentadiene-$C_5$ codimer, methylcyclopentadiene dimer, cyclopentadiene and methylcyclopentadiene trimers and cotrimers, and/or mixtures thereof.

In an aspect, the cyclic monomer is selected in the group consisting of cyclopentene, cyclopentadiene, dicyclopentadiene, cyclohexene, 1,3-cyclohexadiene, 1,4-cyclohexadiene, methylcyclopentadiene, di(methylcyclopentadiene) and mixtures thereof. In an aspect, the cyclic monomer is selected from the group of dicyclopentadiene, cyclopentadiene, and methylcyclopentadiene. In an aspect, the cyclic monomer is cyclopentadiene.

In an aspect, the hydrocarbon resin comprises the cyclic monomer in an amount between 10 wt. % and 90 wt. %. In an aspect, the hydrocarbon resin comprises the cyclic monomer in an amount between 25 wt. % and 80 wt. %.

In an aspect, the hydrocarbon resin comprises dicyclopentadiene, cyclopentadiene, and/or methylcyclopentadiene in an amount between 10 wt. % and 90 wt. %. In an aspect, the hydrocarbon resin comprises dicyclopentadiene, cyclopentadiene, and/or methylcyclopentadiene in an amount between 25 wt. % and 80 wt. %. In an aspect, the hydrocarbon resin comprises methylcyclopentadiene in an amount between 0.1 wt. % and 15 wt. %. In an aspect, the hydrocarbon resin comprises methylcyclopentadiene in an amount between 0.1 wt. % and 5 wt. %.

The subject hydrocarbon resin comprises one or more cyclic monomers that are used to prepare one or more complex copolymers as described herein. The makeup of the complex copolymer can be controlled by the type and the amount of monomer included in the resin, i.e., the microstructure of the copolymer. Monomer placement in the polymer chain, however, is random, leading to further complexity in the polymer microstructure.

In an aspect, the hydrocarbon resin further comprises an aromatic monomer. In an aspect, the aromatic monomer is selected in the group consisting of an olefin-aromatic compounds, aromatic distillation cuts and mixtures thereof.

In an aspect, the hydrocarbon resin comprises the aromatic monomer in an amount between 10 wt. % and 90 wt. %. In an aspect, the hydrocarbon resin comprises the aromatic monomer in an amount between 20 wt. % and 75 wt. %.

In an aspect, the aromatic monomer is an aromatic distillation cut. In an aspect, the hydrocarbon resin comprises an aromatic distillation cut from a petroleum refinery stream such as one obtained by steam cracking streams and then separating the fraction boiling in the range of 135° C. to 220° C. by fractional distillation. In an aspect, the aromatic distillation cut component comprises at least one of styrene, alkyl substituted derivatives of styrene, indene, alkyl substituted derivatives of indene and mixtures thereof. In an aspect, the aromatic distillation cut component comprises 4 wt. % to 7 wt. % of styrene; 20 wt. % to 30 wt. % of alkyl substituted derivatives of styrene, 10 wt. % to 25 wt. % indene, 5 to 10 wt. % alkyl substituted derivatives of indene and 35 wt. % to 45 wt. % non-reactive aromatics.

In an aspect, the aromatic monomer comprises an olefin-aromatic compound selected from the group consisting of indene derivatives, vinylaromatic compounds and mixtures thereof.

In an aspect, the aromatic monomer comprises an indene derivative represented by Formula (I):

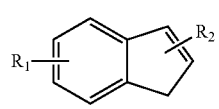

(I)

wherein $R_1$ and $R_2$ represent, independently of one another, a hydrogen atom, an alkyl group, an alkenyl group, a cycloalkyl group, an aryl group or an arylalkyl group. For example such compounds can be 1H-Indene; 1-methyl-1H-indene; alkyl Indene; 5-(2-methylbut-2-enyl)-1H-indene;

5,6,7,8-tetrahydro-1H-cyclopentanaphthalene; 4HIndene-5butan-1ol or derivatives thereof.

In an aspect, the aromatic monomer comprises a vinylaromatic compound represented by Formula (II)

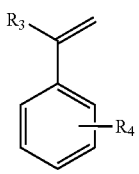

(II)

wherein $R_3$ and $R_4$ represent, independently of one another, a hydrogen atom, an alkyl group, an alkenyl group, a cycloalkyl group, an aryl group or an arylalkyl group. Alpha-methylstyrene or substituted alpha-methylstyrenes having one or more substituents on the aromatic ring are suitable, particularly where the substituents are selected from alkyl, cycloalkyl, aryl, or combination radicals, each having one to eight carbon atoms per substituent. Non limiting examples include alpha-methyl styrene, alpha-methyl-4-butyl styrene, alpha-methyl-3,5-di-t-bensylstyrene, alpha-methyl-3,4,5-trimethyl styrene, alpha-methyl-4-bensylstyrene, alpha-methyl-4-chlorohexylstyrene, and/or mixtures thereof.

The present hydrocarbon resins can be prepared using different methodologies. For example, thermal polymerization of cyclic feed streams can be used in combination or absence of olefin-aromatics, substituted benzene and aromatic distillation cut. As described in the Examples below, different resins were prepared to achieve a desired molecular weight and a certain tackifier cloud point. Specifically, Tables 2A, 2B, 3A and 3B below describe the feed streams, polymerization conditions and final properties of the present hydrocarbon resins.

Incompatibility with base polymers can limit the applications for resins having high Tg where low molecular weight and ease of processing is desirable. The present hydrocarbon resins overcome this deficiency with the novel combination of the Tg and Mn not previously described.

Specifically, the hydrocarbon resin hydrocarbon resin has a content of aromatic proton ("H Ar"), as expressed in percent, of greater than 6 mol %. Further, the hydrocarbon resins are defined by the glass transition temperature ("Tg") and aromatic proton content ("H Ar") as well as the glass transition temperature ("Tg") and number average molecular weight ("Mn"). Even more specifically the present hydrocarbon resins are defined as: Tg≥95−2.2*(H Ar); and Tg≥−53+(0.265*Mn), where Tg is glass transition temperature expressed in ° C. of the resin, H Ar represents the content of aromatic protons in the resin and Mn represents the number average molecular weight of the resin.

In an aspect, the hydrocarbon resin has at least one and preferably all of the following additional features:
 a MMAP cloud point of between 10° C. and 60° C.,
 a number average molecular weight (Mn) of between 150 and 800 g/mol, preferably between 250 and 600 g/mol,
 a glass transition temperature (Tg) represented by Tg≥100−2.2*(H Ar),
 a glass transition temperature (Tg) represented by Tg≥−32+(0.265*Mn),
 an aromatic proton content (H Ar) of greater than 6 mol % and less than 25 mol %.

As described above, the present rubber compositions comprise one or more of the present hydrocarbon resins.

The content of the hydrocarbon resin in the rubber composition can be within a range extending from 15 phr to 150 phr, from 25 phr to 120 phr, from 40 phr to 115 phr, from 50 phr to 110 phr, and from 65 phr to 110 phr. Below 15 phr of the present hydrocarbon resin, the effect of the present hydrocarbon resin becomes insufficient and the rubber composition could have problems of grip. Above 150 phr, the composition could present manufacturing difficulties in terms of readily incorporating the present hydrocarbon resin into the composition.

Elastomer

The tire of the invention comprises a rubber composition based on at least an elastomer matrix and a specific hydrocarbon resin as described above. The elastomer will be further described below. The composition of the tire according to the invention may contain a single elastomer or a mixture of several elastomers, called the elastomer matrix.

As used herein, the terms "elastomer" and "rubber" are used interchangeably. They are well known by the person skilled in the art.

"Diene elastomer" refers to an elastomer resulting at least in part (homopolymer or copolymer) from diene monomers (monomers bearing two double carbon-carbon bonds, whether conjugated or not). The diene elastomer can be "highly unsaturated," resulting from conjugated diene monomers, which have a greater than 50% molar content of units.

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, and as is well known by those skilled in the art, diene elastomer is understood more particularly to mean:
 (a) any homopolymer obtained by polymerization of a conjugated diene monomer having from 4 to 12 carbon atoms;
 (b) any copolymer obtained by copolymerization of one or more conjugated dienes with one another or with one or more vinylaromatic compounds having from 8 to 20 carbon atoms;
 (c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidene norbornene or dicyclopentadiene;
 (d) a copolymer of isobutene and of isoprene (butyl rubber) and also the halogenated versions, in particular chlorinated or brominated versions, of this type of copolymer.

For the purposes of the invention, the tire composition comprises an elastomer matrix comprising from 50 to 100 phr of one or more copolymers of butadiene and of vinylaromatic monomer, having a content of vinylaromatic units of between 0 and 5% by weight and a Tg within a range extending from −110° C. to −70° C. Thus, the copolymers of butadiene and of vinylaromatic monomer may contain from 95 to less than 100% by weight of diene units and from more than 0 to 5% by weight of vinylaromatic units.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene. Preferably, the vinylaromatic monomer of the copolymer of butadiene and of vinylaromatic monomer is styrene.

The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution. In the case of a copolymer based on a diene and on a vinylaromatic, especially containing butadiene and styrene, preferentially the two monomers are randomly distributed.

The copolymer of butadiene and of vinylaromatic monomer may be coupled and/or star branched or functionalized by a group introduced via a coupling and/or star-branching or functionalization agent known to those skilled in the art. This group may be located at the end of the linear main elastomer chain. It will then be stated that the diene elastomer is chain-end functionalized. This is generally an elastomer obtained by reaction of a living elastomer with a functionalization agent, that is to say any at least monofunctional molecule, the function being any type of chemical group known by those skilled in the art to react with a living chain end.

This group may be located in the linear main elastomer chain. It will then be stated that the diene elastomer is coupled or functionalized in the middle of the chain, as opposed to the "chain end" position and although the group is not located precisely in the middle of the elastomer chain. This is generally an elastomer obtained by reaction of two chains of the living elastomer with a coupling agent, that is to say any at least difunctional molecule, the function being any type of chemical group known by those skilled in the art to react with a living chain end.

This group may be central, to which n elastomer chains (n>2) are bonded, forming a star-branched structure. It will then be stated that the diene elastomer is star-branched. This is generally an elastomer obtained by reaction of n chains of the living elastomer with a star-branching agent, that is to say any polyfunctional molecule, the function being any type of chemical group known by those skilled in the art to react with a living chain end.

Those skilled in the art will understand that a functionalization reaction with an agent comprising more than one function which is reactive with regard to the living elastomer results in a mixture of entities functionalized at the chain end and in the middle of the chain, constituting the linear chains of the functionalized elastomer, and also, if appropriate, star-branched entities. Depending on the operating conditions, mainly the molar ratio of the functionalization agent to the living chains, certain entities are predominant in the mixture.

Preferentially, for the purposes of the invention, said copolymer of butadiene and of vinylaromatic monomer has a Tg within a range extending from −110° C. to −80° C., preferably from −95° C. to −80° C.

Also preferably, said copolymer of butadiene and of vinylaromatic monomer has a Mooney viscosity within a range extending from 50 to 80. In the present description, Mooney viscosity is intended to mean the ML(1+4)100° C. Mooney viscosity of a compound, especially of the copolymer of butadiene and of vinylaromatic monomer of use to the invention, measured according to standard ASTM D1646.

According to a preferred embodiment, said copolymer of butadiene and of vinylaromatic monomer has a content of vinylaromatic units of 1 to 4% by weight relative to the total weight of the copolymer, and also a content of vinyl units, relative to the diene portion, ranging from 8 to 15% by weight, preferably ranging from 10 to 15% by weight.

Preferably, at least 70% by weight of said copolymer of butadiene and of vinylaromatic monomer is functionalized, preferentially by an alkoxysilane group, optionally partially or totally hydrolysed to give silanol, the alkoxysilane group bearing or not bearing another function capable of interacting with a reinforcing filler, the alkoxysilane group being bonded to the diene elastomer via the silicon atom. Preferentially, said copolymer of butadiene and of vinylaromatic monomer is predominantly functionalized in the middle of the chain. The microstructure of these elastomers may be determined by the presence or absence of a polar agent and the amounts of polar agent employed during the anionic polymerization step. Preferentially, when the diene elastomer is based on a diene and styrene, a polar agent is used during the polymerization step in amounts such that it promotes the random distribution of the styrene along the polymer chains while retaining the content of 1,2-bonds at preferably between 8% and 15%, preferably from 10% to 15%.

The term "alkoxysilane group interacting favourably with the reinforcing filler" or "function capable of interacting with a reinforcing filler" is understood to mean any other alkoxysilane group or function, preferentially amine, capable of forming, within a rubber composition reinforced by means of a filler, a physical or chemical bond with said filler. This interaction can be established, for example, via covalent, hydrogen, ionic and/or electrostatic bonds between said function and functions present on fillers.

The alkoxy radical of the alkoxysilane group may be of formula R'O—, where R' represents a substituted or unsubstituted C1-C10, or even C1-C8, alkyl group, preferably a C1-C4 alkyl group, more preferentially methyl and ethyl.

The other function as mentioned above may for example be an amine, a thiol, a polyoxyethylene or polyether group. Very preferentially, the other function capable of interacting with a reinforcing filler is a primary, secondary or tertiary amine. This variant of the invention is particularly advantageous due to the improvement in hysteresis properties.

In the present description, primary or secondary amine is intended to mean a primary or secondary amine protected or not protected by a protecting group known to those skilled in the art.

Mention may be made, as secondary or tertiary amine function, of amines substituted by C1-C10, preferably C1-C4, alkyl radicals, more preferentially a methyl or ethyl radical, or else cyclic amines forming a heterocycle containing a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino- groups, preferably the diethylamino- and dimethylamino- groups, are suitable.

Preferably, the function capable of interacting with a reinforcing filler is a tertiary amine function, preferably diethylamine or dimethylamine.

According to a variant of the invention, the function, preferentially primary, secondary or tertiary amine, capable of interacting with a reinforcing filler is directly bonded to the silicon atom itself directly bonded to the diene elastomer.

According to another variant of the invention, the function, preferentially primary, secondary or tertiary amine, capable of interacting with a reinforcing filler and the silicon atom bonded to the diene elastomer are connected to one another via a spacer group which may be an atom or a group of atoms. The spacer group may be a saturated or unsaturated, cyclic or non-cyclic, linear or branched, divalent C1-C18 aliphatic hydrocarbon-based radical or a divalent C6-C18 aromatic hydrocarbon-based radical and may contain one or more aromatic radicals and/or one or more heteroatoms. The hydrocarbon-based radical may optionally be substituted.

Preferably, said copolymer of butadiene and of vinylaromatic monomer comprises more than 0 and up to 30% by weight (more preferentially between 0 and 20%), relative to the total weight of the copolymer of butadiene and of vinylaromatic monomer, of a star-branched copolymer of butadiene and of vinylaromatic monomer.

Preferably, said copolymer of butadiene and of vinylaromatic monomer is present in the elastomer matrix, at a total content of 75 to 100 phr, preferably of 90 to 100 phr, better still of 100 phr.

When the elastomer matrix comprises them, the supplemental elastomers of the copolymers of butadiene and of vinylaromatic monomer may be any elastomers known to those skilled in the art and especially an elastomer selected from the group consisting of polybutadienes, natural or synthetic polyisoprenes, isoprene copolymers, butadiene copolymers other than those already required for the invention, and mixtures thereof. Preferably, these supplemental elastomers are selected from the group consisting of polybutadienes, natural or synthetic polyisoprenes, copolymers of isoprene and of vinylaromatic monomer, copolymers of butadiene and of vinylaromatic monomer having a Tg of greater than −70° C., and mixtures thereof.

Reinforcing Filler

The composition can comprise a reinforcing filler. Use may be made of any type of reinforcing filler known for its abilities to reinforce a rubber composition which can be used for the manufacture of tires, for example an organic filler, such as carbon black, a reinforcing inorganic filler, such as silica or alumina, or also a blend of these two types of filler.

As described herein, reinforcing filler can be selected from the group consisting of silicas, carbon blacks and the mixtures thereof.

The content of reinforcing filler can be within a range extending from 5 phr to 200 phr, and from 40 to 160 phr. In an aspect, reinforcing filler is silica, in an aspect, at a content within a range extending from 40 phr to 150 phr. The composition provided herein can comprise a minority amount of carbon black, where, in an aspect, the content is within a range extending from 0.1 phr to 10 phr.

All carbon blacks, especially "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

The present rubber compositions can comprise one type of silica or a blend of several silicas. The silica used can be any reinforcing silica, especially any precipitated or fumed silica exhibiting a BET surface area and a CTAB specific surface area, each one being less than 450 m$^2$/g, such as from 30 m$^2$/g to 400 m$^2$/g. Mention will be made, as highly dispersible precipitated silicas ("HDSs"), for example, of the "Ultrasil 7000" and "Ultrasil 7005" silicas from Degussa, the "Zeosil 1165MP", "1135MP" and "1115MP" silicas from Rhodia, the "Hi-Sil EZ150G" silica from PPG, the "Zeopol 8715", "8745" and "8755" silicas from Huber, treated precipitated silicas, such as, for example, the silicas "doped" with aluminium described in Application EP-A-0735088, or the silicas with a high specific surface as described in Application WO 03/16837. The silica can have a BET specific surface of between 45 and 400 m$^2$/g, and preferably between 60 and 300 m$^2$/g.

The present rubber compositions can optionally also comprise (in addition to the coupling agents) coupling activators, agents for covering the inorganic fillers and any other processing aid capable by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use can be made especially of silane polysulfides, referred to as "symmetrical" or "asymmetrical" depending on their specific structure, such as described, for example, in applications WO 03/002648 (or US 2005/016651) and WO 03/002649 (or US 2005/016650).

Also, suitable in particular, without the definition below being limiting, are silane polysulfides referred to as "symmetrical," corresponding to the following general Formula III:

$$Z\text{-}A\text{-}Sx\text{-}A\text{-}Z, \text{ in which:} \qquad (III)$$

x is an integer from 2 to 8 (such as from 2 to 5);

A is a divalent hydrocarbon radical (such as $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);

Z corresponds to one of the formulae below:

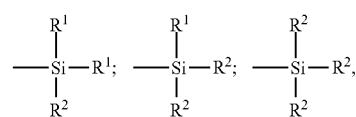

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (as such $C_1$-$C_6$ alkyl, cyclohexyl or phenyl groups, in particular $C_1$-$C_4$ alkyl groups, more particularly methyl and/or ethyl), the $R^2$ radicals, which are substituted or unsubstituted and identical to or different from one another, represent a $C_1$-$C_{18}$ alkoxy or $C_5$-$C_{18}$ cycloalkoxy group (such as a group chosen from $C_1$-$C_8$ alkoxys and $C_5$-$C_8$ cycloalkoxys, such as a group chosen from $C_1$-$C_4$ alkoxys, in particular methoxy and ethoxy).

In the case of a mixture of alkoxysilane polysulfides corresponding to the above Formula (III), especially normal commercially available mixtures, the mean value of the "x" indices is a fractional number such as between 2 and 5, of approximately 4. However, advantageously, the mixture can be carried out with alkoxysilane disulfides (x=2). Examples include silane polysulfides of bis(($C_1$-$C_4$)alkoxy($C_1$-$C_4$)alkylsilyl($C_1$-$C_4$)alkyl) polysulfides (especially disulfides, trisulfides or tetrasulfides), such as, for example, bis(3-trimethoxysilylpropyl) or bis(3-triethoxysilylpropyl) polysulfides. Use can be made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Other examples include bis(mono($C_1$-$C_4$)alkoxyldi($C_1$-$C_4$)alkylsilylpropyl) polysulfides (in particular disulfides, trisulfides or tetrasulfides), more particularly bis(monoethoxydimethylsilylpropyl) tetrasulfide, such as described in Patent Application WO 02/083782 (or US 2004/132880). Mention will also be made, as coupling agent other than alkoxysilane polysulfide, of bifunctional POSs (polyorganosiloxanes) or else of hydroxysilane polysulfides ($R^2$=OH in the above formula III), such as described in published patent applications WO 02/30939 (or U.S. Pat. No. 6,774,255) and WO 02/31041 (or US 2004/051210), or else of silanes or POSs bearing azodicarbonyl functional groups, such as described, for example, in published patent applications WO 2006/125532, WO 2006/125533 and WO 2006/125534.

The content of coupling agent in the present compositions can be between 1 phr to 15 phr, and between 3 phr to 14 phr.

In addition, filler can be made of a reinforcing filler of another nature, especially organic, provided that this reinforcing filler is covered with a layer of silica or else comprises functional sites, especially hydroxyl sites, at its surface which require the use of a coupling agent in order to form the bond between the filler and the elastomer.

The physical state in which the reinforcing filler is provided is not important, whether it is in the form of a powder, micropearl, granule, bead and/or any other appropriate densified form.

Crosslinking Systems

In the rubber compositions provided herein, any type of crosslinking system for rubber compositions can be used.

The crosslinking system can be a vulcanization system, that is to say based on sulfur (or on a sulfur-donating agent) and a primary vulcanization accelerator. Various known secondary vulcanization accelerators or vulcanization activators, such as zinc oxide, stearic acid or equivalent compounds, or guanidine derivatives (in particular diphenylguanidine), may be added to this base vulcanization system, being incorporated during the first non-productive phase and/or during the productive phase, as described subsequently.

Sulfur can be used at a content of between 0.5 phr and 10 phr, between 0.5 phr and 5 phr, in particular between 0.5 and 3 phr.

The vulcanization system of the composition also can comprise one or more additional accelerators, for example compounds of the family of the thiurams, zinc dithiocarbamate derivatives, sulfenamides, guanidines or thiophosphates. Use may in particular be made of any compound capable of acting as accelerator of the vulcanization of diene elastomers in the presence of sulfur, especially accelerators of thiazoles type and also their derivatives, accelerators of the thiurams type, and zinc dithiocarbamates. These accelerators are selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Use is made of a primary accelerator of the sulfenamide type.

The rubber compositions can optionally comprise all or a portion of the normal additives customarily used in elastomer compositions intended especially for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example, novolac phenolic resin) or donors (for example HMT or H3M).

The rubber compositions can also comprise a plasticizing system. This plasticizing system may be composed of a hydrocarbon-based resin with a Tg of greater than 20° C., in addition to the specific hydrocarbon-based resin described above, and/or a plasticizing oil.

Of course, the compositions can be used alone or in a blend (i.e., in a mixture) with any other rubber composition which can be used in the manufacture of tires.

The rubber compositions described herein can be both in the "uncured" or non-crosslinked state (i.e., before curing) and in the "cured" or crosslinked, or else vulcanized, state (i.e., after crosslinking or vulcanization).

Preparation of the Rubber Compositions

The rubber compositions are manufactured in appropriate mixers, using two successive phases of preparation: a first phase of thermomechanical working or kneading (sometimes referred to as "non-productive" phase) at high temperature, up to a maximum temperature of between 110° C. and 200° C., for example between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in applications EP-A-0 501 227, EP-A-0 735 088, EP-A-0 810 258, WO 00/05300 or WO 00/05301.

The first (non-productive) phase is carried out in several thermomechanical stages. During a first step, the elastomers, the reinforcing fillers and the hydrocarbon resin (and optionally the coupling agents and/or other ingredients, with the exception of the crosslinking system) are introduced into an appropriate mixer, such as a customary internal mixer, at a temperature between 20° C. and 100° C. and preferably between 25° C. and 100° C. After a few minutes, from 0.5 to 2 min, and a rise in the temperature to 90° C. or to 100° C., the other ingredients (that is to say, those which remain, if not all were put in at the start) are added all at once or in portions, with the exception of the crosslinking system, during a mixing ranging from 20 seconds to a few minutes. The total duration of the kneading, in this non-productive phase, is between 2 and 10 minutes at a temperature of less than or equal to 180° C. and preferably less than or equal to 170° C.

After cooling the mixture thus obtained, the crosslinking system is then incorporated at low temperature (typically less than 100° C.), generally in an external mixer, such as an open mill. The combined mixture is then mixed (productive phase) for several minutes, for example between 5 and 15 min.

The final composition thus obtained is subsequently calendared, for example in the form of a sheet or slab, in particular for laboratory characterization, or else extruded, in order to form, for example, a rubber profiled element used in the manufacture of semi-finished products for tires. These products may then be used for the manufacture of tires, with the advantage of having good tack of the layers on one another before curing of the tire.

The crosslinking (or curing) can be carried out at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tire.

Test Methods Useful for Invention

The features of the present hydrocarbon resins and compositions containing the hydrocarbon resin are demonstrated in the following non-limiting examples. Test methods and experimental procedures used in the examples are described immediately below.

Molecular weight distribution ("MWD") is equivalent to the expression $M_w/M_n$. The expression $M_w/M_n$ is the ratio of the weight average molecular weight ($M_w$) to the number average molecular weight ($M_n$).

The weight average molecular weight is given by $$M_w = \frac{\sum_i n_i M_i^2}{\sum_i n_i M_i}$$

the number average molecular weight is given by $$M_n = \frac{\sum_i n_i M_i}{\sum_i n_i}$$

the z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are determined by Gel Permeation Chromatography as described further below.

Gel Permeation Chromatography (GPC). The distribution and the moments of molecular weight (Mw, Mn, Mw/Mn, etc.) were determined by using room temperature (20° C.) Gel Permeation Chromatography equipped using "Tosoh EcoSEC HLC-8320GPC" with enclosed Refractive Index (RI) Ultraviolet and (UV) detectors. Four "Agilent PLgel" of 5 μm 50Å; 5 μm 500Å; 5 μm 10E3A; 5 μm Mixed-D were used in series. "Aldrich" reagent grade tetrahydrofuran (THF) was used as the mobile phase. The polymer mixture was filtered through a 0.45μ "Teflon" filter and degassed with an online degasser before entering the GPC instrument. The nominal flow rate was 1.0 mL/min and the nominal injection volume is 200 μL. The molecular weight analysis was performed with "EcoSEC" software.

The concentration (c), at each point in the chromatogram was calculated from the baseline-subtracted IR5 broadband signal intensity (I), using the following equation: c=βI, where "β" is the mass constant determined with polystyrene standards. The mass recovery was calculated from the ratio of the integrated area of the concentration chromatography over elution volume and the injection mass which is equal to the pre-determined concentration multiplied by injection loop volume.

Molecular Weight. The molecular weight was determined by using a polystyrene calibration relationship with the column calibration which is performed with a series of mono-dispersed polystyrene (PS) standards of 162, 370, 580, 935, 1860, 2980, 4900, 6940, 9960, 18340, 30230, 47190 & 66000 kg/mole. The molecular weight "M" at each elution volume is calculated with following equation:

$$\log M = \frac{\log(K_{PS}/K)}{a+1} + \frac{a_{PS}+1}{a+1} \log M_{PS}$$

where the variables with subscript "PS" stand for polystyrene while those without a subscript correspond to the test samples. In this method aPS=0.67 and KPS=0.000175, "a" and "K" being calculated from a series of empirical formula (T. Sun, P. Brant, R. R. Chance, and W. W. Graessley, 34(19) MACROMOLECULES 6812-6820 (2001)). Specifically, a/K=0.695/0.000579 for polyethylene and 0.705/0.0002288 for polypropylene. All concentrations are expressed in g/cm3, molecular weight is expressed in g/mole, and intrinsic viscosity is expressed in dL/g unless otherwise noted.

DSC Measurements. The following DSC procedure was used to determine the glass transition temperatures (Tg) of hydrocarbon resin. Approximately 6 mg of material was placed in a microliter aluminum sample pan. The sample was placed in a differential scanning calorimeter ("Perkin Elmer" or "TA Instrument" Thermal Analysis System) and was heated from 23° C. to 200° C. at 10° C./minute and held at 200° C. for 3 minutes. Afterward, the sample was cooled down to −50° C. at 10° C./minute. The sample was held at −50° C. for 3 minutes and then heated from −50° C. to 200° C. at 10° C./minute for a second heating cycle. The Tg was determined in the "TA Universal Analysis" on the second heating cycle, using inflection method. The "Glass Transition" menu item on the "TA Universal Analysis" equipment is used to calculate the onset, end, inflection, and signal change of Tg in the DSC. The program enables the determination of the onset, which is the intersection of the first and second tangents, where the inflection is the portion of the curve between the first and third tangents with the steepest slope, and the end is the intersection of the second and third tangents. The Tg of the hydrocarbon resin is the inflection temperature of the curve.

Aromatic Protons (H AR) percentage: 500 MHz NMR instrument is used in TCE-d2(1, 2 dichloroethane) or CDCl3 (chloroform) solvent at 25° C. and 120 scans are done. NMR data of the hydrocarbon resin were measured by dissolving 20±1 mg of sample in 0.7 ml of d-solvents. The samples are dissolved in TCE-d2 in 5 mm NMR tube at 25° C. until the sample was dissolved. There is no standard used. The TCE-d2/CDCl3 presents as a peak at 5.98 or 7.24 ppm and used as the reference peak for the samples. The $^1$H NMR signals of the aromatic protons are located between 8.5 ppm and 6.2 ppm. The ethylenic protons give rise to signals between 6.2 ppm and 4.5 ppm. Finally, the signals corresponding to aliphatic protons are located between 4.5 ppm and 0 ppm. The areas of each category of protons are related to the sum of these areas to thereby give a distribution in terms of % of area for each category of protons.

MMAP Cloud Point. MMAP cloud point is the temperature where one or more modifiers, tackifiers or agents as dissolved in solvent is no longer completely soluble (as determined by a cloudy appearance of the tackifier/solvent mixture). As presented herein, MMAP cloud points were determined using a modified ASTM D-611–82 method, substituting methylcyclohexane for the heptane used in the standard test procedure. The procedure used tackifier/aniline/methycyclohexane in a ratio of 1/2/1 (5 g/10 mL/5 mL). The MMAP cloud point was determined by cooling a heated, clear blend of the three components until a complete turbidity occurs.

Softening Point. "Softening Point" is the temperature, measured in ° C., at which a material will flow, as determined according to the Ring & Ball Method, as measured by ASTM E-28. As a rule of thumb, the relationship between Tg and softening point is approximately: Tg=softening point−50° C.

Dynamic Properties of Compositions (after Curing)

The dynamic properties G* and tan(δ)max are measured on a viscosity analyzer ("Metravib V A4000") according to Standard ASTM D 5992-96. The response of a sample of vulcanized composition (cylindrical test specimen with a thickness of 4 mm and a diameter of 10 mm), subjected to a simple alternating sinusoidal shear stress, at a frequency of 10 Hz, under temperature condition (23° C.) according to Standard ASTM D 1349-99, or at a different temperature. A deformation sweep is performed from 0.1% to 50% (forward cycle), then from 50% to 0.1% (return cycle). For the return cycle, the value of rigidity at 10% deformation is then noted.

The higher the value of rigidity at 10% deformation and 23° C., the more the composition will provide good road handling. The results are expressed in terms of performance base 100, that is to say that the value 100 is arbitrarily assigned to the control, in order to subsequently compare the G*10% at 23° C. (that is to say the rigidity and hence the road handling) of the various solutions tested. The value in base 100 is calculated according to the operation (value of G*10% at 23° C. of the sample/value of G*10% at 23° C. of the control)*100. Therefore, a higher value represents an improvement of the road handling performance, while a lower value represents a reduction in the road handling performance.

The higher the value of rigidity at 10% deformation and 40° C., the more the composition will provide good road handling. The results are expressed in terms of performance base 100, that is to say that the value 100 is arbitrarily assigned to the control, in order to subsequently compare the G*10% at 40° C. (that is to say the rigidity and hence the road handling) of the various solutions tested. The value in base 100 is calculated according to the operation (value of G*10% at 40° C. of the sample/value of G*10% at 40° C. of the control)*100. Therefore, a higher value represents an improvement of the road handling performance, while a lower value represents a reduction in the road handling performance.

The following examples are intended to highlight various aspects of certain embodiments of the present invention. It should be understood, however, that these examples are included merely for purposes of illustration and are not intended to limit the scope of the invention, unless otherwise specifically indicated.

Example 1

With respect to processes for making prior art hydrocarbon resins, they have been prepared by thermally polymerizing a mixture consisting essentially of 5% to 25% by weight styrene or aliphatic or aromatic substituted styrene and 95% to 75% by weight based on total monomer content of cyclic diolefin component comprising at least 50% by weight dicyclopentadiene (e.g., see U.S. Pat. No. 6,825,291). This procedure of sequential monomer addition has been used to control the molecular weight of the hydrocarbon resin. Not only is this process cumbersome, but can result in broad polydispersity of the hydrocarbon resin. Table 1 below summarizes the comparative results obtained.

TABLE 1

| Sample | Reference | Mn (g/mol) | Tg (° C.) | H Ar (%) | MMAP Cloud Point |
|---|---|---|---|---|---|
| 1 | E5615 | 509 | 68 | 10% | 46.7 |
| 2 | E5600 | 484 | 51 | 10% | 47.1 |

Example 2: Analysis of the Invention Specific Hydrocarbon Resins

Hydrocarbon resin (HR) samples Nos. 5 to 9 were prepared by varying the feed streams in a thermal polymerization unit known to achieve a certain tackifier cloud point. After processing in the thermal polymerization unit, the tackifiers were nitrogen-stripped at 200° C. The properties of the hydrocarbon resins are provided in the Tables 2A, 2B, 3A and 3B below. The resins described herein can be produced by known methods (e.g., see the Kirk-Othmer Encyclopedia of Chemical Technology, 4th ed., Vol. 13, pp. 717-744). One method is to thermally polymerize petroleum fractions. Polymerization can be batch, semi-batch or continuous. Thermal polymerization is often carried out at a temperature between 160° C. and 320° C., for example, at 260° C.-280° C., for a period of 0.5 to 9 hours, and often 1.0 to 4 hours. Thermal polymerization is usually carried out in presence or absence of inert solvent.

The inert solvent can have a boiling point range from 60° C. to 260° C. and can be selected from isopropanol, toluene, heptane, Exxsol™ or Varsol™ or base "White spirit" from 2 wt. % to 50 wt. %. Solvents can be used individually or in combinations thereof.

The hydrocarbon resin produced can be optionally dissolved in an inert, de-aromatized or non-de-aromatized hydrocarbon solvent such as Exxsol™ or Varsol™ or base "White spirit" in proportions varying from 10% to 60% and for example in the region of 30% by weight polymer. Hydrogenation is then conducted in a fixed-bed, continuous reactor with the feed flow either in an up flow or downflow liquid phase, or trickle bed operation.

Hydrogenation treating conditions generally include reactions ranging in temperature of from 100° C. to 350° C., from 150° C. to 300° C., and from 160° C. to 270° C. The hydrogen pressure within the reactor should not exceed more than 2000 psi, for example, no more than 1500 psi, and/or no more than 1000 psi. The hydrogenation pressure is a function of the hydrogen purity and the overall reaction pressure should be higher if the hydrogen contains impurities to give the desired hydrogen pressure. Typically, the optimal pressure used is between 750 psi and 1500 psi, and/or between 800 psi and 1000 psi. The hydrogen to feed volume ratio to the reactor under standard conditions (25° C., 1 atm pressure) typically can range from 20 to 200. Further exemplary methods for preparing the hydrocarbon resins described herein are generally found in U.S. Pat. No. 6,433,104.

Tables 2A and 2B below include the feed streams, polymerizing conditions and properties obtained for comparative hydrocarbon resins.

TABLE 2A

Hydrocarbon Resins

| Feed streams | HR 5 | HR 6 | HR 7 | HR 8 | HR 9 |
|---|---|---|---|---|---|
| Cyclics (wt %) | 44 | 48 | 58.8 | 54.9 | 32.9 |
| Olefin Aromatics (wt %) | 0 | 0 | 25 | 0 | 25 |
| Substituted benzene (wt %) | 0 | 0 | 0 | 35 | 0 |
| Aromatic distillation cut (wt %) | 56 | 52 | 0 | 0 | 40 |
| MCPD (wt %) | 0 | 0 | 0.2 | 0.1 | 0.1 |
| Solvent (wt %) | 0 | 0 | 16 | 10 | 2 |
| Reaction temperature (° C.) | 260 | 265 | 275 | 275 | 275 |
| Reaction time (min) | 60 | 60 | 65 | 65 | 65 |

TABLE 2B

Present hydrocarbon resin Properties Measured After Hydrogenation

| HR | 5 | 6 | 7 | 8 | 9 |
|---|---|---|---|---|---|
| HR Softening Point (° C.) | 127 | 137 | >150 | 145 | 135 |
| HR Tg (° C.) | 78 | 86 | 108 | 94 | 86 |
| MMAP cloud point (° C.) | 49.3 | 32.6 | 28.6 | 42.1 | 15.7 |
| Mn (g/mol) | 453 | 482 | 411 | 541 | 446 |
| Mw/Mn (MWD) | 1.7 | 1.6 | 1.4 | 1.6 | 1.5 |
| Aromatic H (H Ar) in mol % | 9.68 | 8.3 | 9.0 | 9.6 | 20.3 |

As provided in Tables 3A and 3B, comparative examples 9A, 9B, 9C and 8A were prepared with varying vinyl aromatics feed stream consisting of styrene and vinyl toluene. The comparative HR have significantly higher Mn and with much lower Tg than the present HR 9. The relative rate of reaction of homo-oligomerization of vinyl aromatics is higher than copolymerization of cyclics & vinyl aromatics under the reaction condition of the present invention. The homo-oligomers formed exhibit higher Mn than desired for an optimum HR. It is desirable to react substantially all of the theoretical amount of vinyl aromatics monomers with the cyclic feed to minimize the homo polymerization to form undesirable high molecular weight polymer.

Similarly, comparative HR 8A is produced with a combination of aromatic distillation cut and substituted benzene derivatives. The comparative HR 8A has a much lower Tg and higher Mn than compared to HR 8.

The HR can be a hydrogenated cyclopentadiene or a hydrogenated cyclopentadiene derivative with or without the aromatic component (olefin-aromatics, substituted benzene and aromatic distillation cut).

TABLE 3A

Comparatives

| Feed streams | Comp. 9 A | Comp. 9B | Comp. 9C | Comp. 8A |
|---|---|---|---|---|
| Cyclics | 30 | 40 | 19.4 | 19.4 |
| Olefin Aromatics | 0 | 0 | 0 | 0 |
| Vinyl Aromatics | 10 | 28 | 10 | 0 |
| Substituted benzene | 0 | 0 | 0 | 10 |
| Aromatic distillation | 45 | 0 | 68 | 68 |
| MCPD | 0 | 4.5 | 2.6 | 2.6 |
| Solvent | 15 | 27.5 | 0 | 0 |
| Reaction temperature (° C.) | 265 | 265 | 265 | 265 |
| Reaction time (min) | 60 | 60 | 60 | 60 |

TABLE 3B

Comparatives Properties Measured After Hydrogenation

| HR | 9A | 9B | 9C | 8A |
|---|---|---|---|---|
| HR Softening Point (° C.) | 113 | 128 | 92 | 90 |
| HR Tg (° C.) | 60 | 78 | 42 | 40 |
| MMAP Cloud Point (° C.) | 25.6 | 38.8 | 13.6 | 15.5 |
| Mn (g/mol) | 565 | 591 | 512 | 535 |
| Mw/Mn (MWD) | 1.9 | 1.5 | 2.0 | 1.8 |
| Aromatic H (H Ar) in mol % | 18 | 15 | 29 | 28 |

Figure 2:
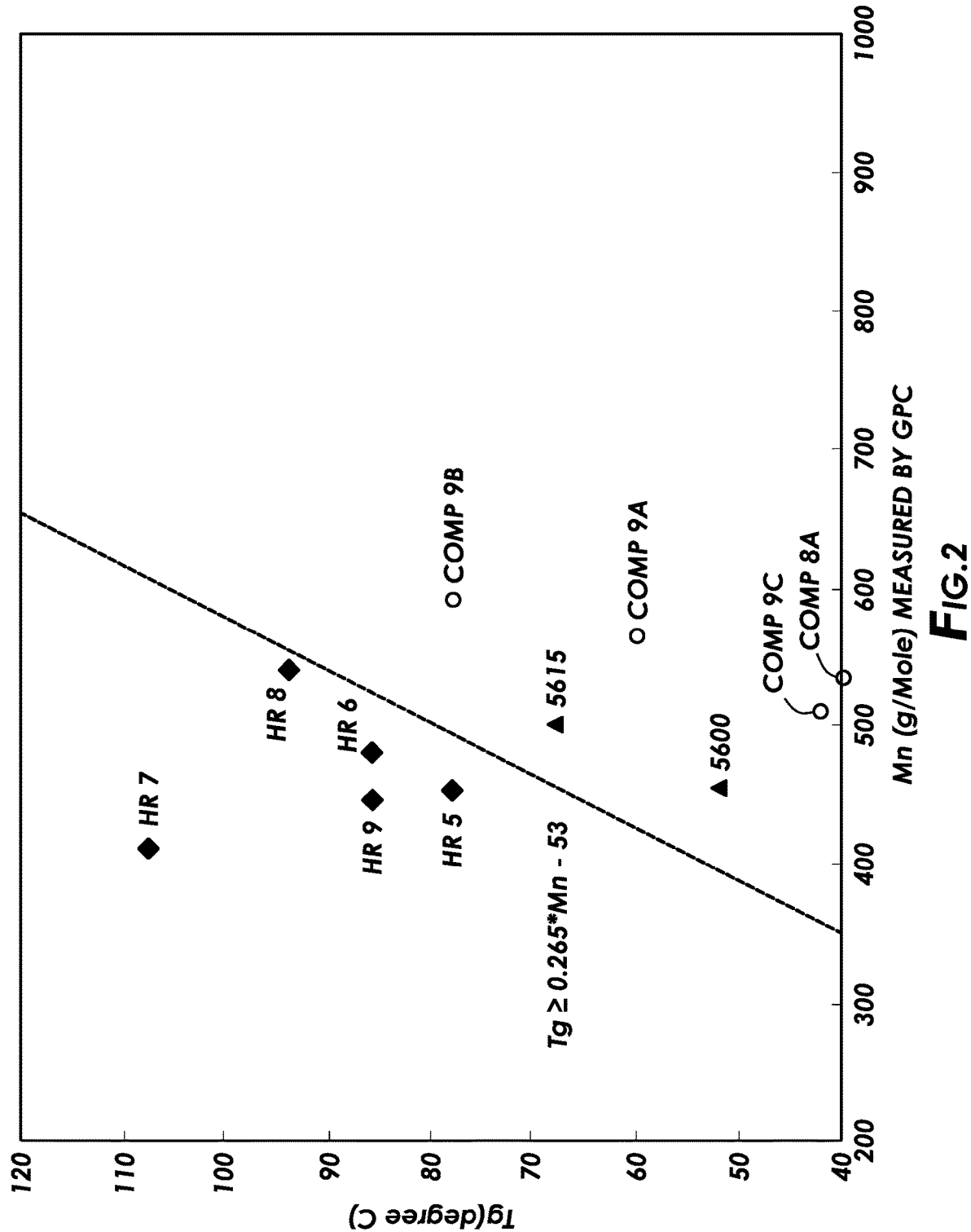
FIG. 2 is a graph of Tg and $M_n$ relationship of the present hydrocarbon resins, comparative prior art hydrocarbon additives and prior art comparative elastomeric compositions.

FIG. 1 is a graph showing the Tg and H Ar relationship of the present hydrocarbon resins, comparative resins and commercial prior art elastomeric compositions. FIG. 2 is a graph showing the Tg and Mn relationship of the present HRs, comparative resins and prior art comparative elastomeric compositions.

Example 3: Preparation of an SBR that is Aminoalkoxysilane-Functional in the Middle of the Chain with a Tg of −88° C.

Methylcyclohexane, butadiene, styrene and tetrahydrofurfuryl ethyl ether are continuously introduced into a stirred continuously fed 32 l reactor, assumed to be perfectly stirred according to those skilled in the art, according to the following proportions: butadiene flow rate by weight=4.013 kg·h−1, styrene flow rate by weight=0.122 kg·h−1, concentration by weight of monomer=9.75 wt. %, 15 ppm of tetrahydrofurfuryl ethyl ether. n-Butyllithium (n-BuLi) is introduced in a sufficient amount in order to neutralize the protic impurities introduced by the different constituents present in the inlet of the first reactor; 850 μmol of n-BuLi per 100 g of monomer are introduced.

The different flow rates are calculated in order for the mean residence time in the reactor to be 35 min. The temperature is maintained at 95° C. A sample of polymer solution is withdrawn at the outlet of the polymerization reactor. The polymer thus obtained is subjected to an antioxidizing treatment with addition of 0.4 phr of 2,2′-methylenebis(4-methyl-6-(tert-butyl)phenol) and 0.2 phr of N-(1,3-dimethylbutyl)-N′-phenyl-p-phenylenediamine. The polymer thus treated is subsequently separated from its solution by a steam stripping operation and then dried on an open mill at 100° C. The "initial" intrinsic viscosity measured is 1.98 dl·g−1. The number-average molar mass Mn, determined by the SEC technique, is 90 000 g·mol−1 and the polydispersity index PI is 1.90. At the outlet of the polymerization reactor, 440 μmol per 100 g of monomer of (3-N,N-dimethylaminopropyl)trimethoxysilane (coupling and star-branching agent CA) in solution in methylcyclohexane are added to the solution of living polymer (CA/Li=0.52).

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C.

The "final" intrinsic viscosity measured is 2.52 dl·g−1. The jump in viscosity, defined as the ratio of said "final" viscosity to said "initial" viscosity, is in this instance 1.27. The Mooney viscosity of this polymer A is 70. The number-average molar mass Mn, determined by the SEC technique, is 168 600 g·mol-1 and the polydispersity index PI is 1.68. The microstructure of this polymer is determined by the NIR method. The content of 1,2-units is 12.7% relative to the butadiene units. The content by weight of styrene is 2.1%. The glass transition temperature of this polymer is −88° C. The cold flow CF(1+6)100° C. of the polymer is 0.52. The distribution of the entities after functionalization is given with the modelling method described above: 86% of functional chains, 77% of which are functional in the middle of the chain, and 14% of star-branched non-functional chains.

Example 4: Exemplary Rubber Compositions

Rubber compositions are manufactured with introduction of all of the constituents onto an internal mixer, with the exception of the vulcanization system. The vulcanization agents (sulfur and accelerator) are introduced onto an external mixer at low temperature (the constituent rolls of the mixer being at 30° C.).

The object of the examples presented in Table 4 is to compare the different rubber properties of control compositions (T1 to T2) to the properties of composition having the present hydrocarbon resin 5 to 9 ($C_1$ to $C_5$). The properties measured, before and after curing, are presented in Table 5.

TABLE 4

Rubber Composition of Different hydrocarbon resins

|  | T1 | T2 | C1 | C2 | C3 | C4 | C5 |
| --- | --- | --- | --- | --- | --- | --- | --- |
| SBR (1) | 100 | 100 | 100 | 100 | 100 | 100 | 100 |
| Carbon black (2) | 4 | 4 | 4 | 4 | 4 | 4 | 4 |
| Silica (3) | 130 | 130 | 130 | 130 | 130 | 130 | 130 |
| E5615 | 88 | — | — | — | — | — | — |
| E5600 | — | 88 | — | — | — | — | — |
| HR 5 | — | — | 88 | — | — | — | — |
| HR 6 | — | — | — | 88 | — | — | — |
| HR 7 | — | — | — | — | 88 | — | — |
| HR 8 | — | — | — | — | — | 88 | — |
| HR 9 | — | — | — | — | — | — | 88 |
| Antioxidant (4) | 6 | 6 | 6 | 6 | 6 | 6 | 6 |
| Coupling agent (5) | 13 | 13 | 13 | 13 | 13 | 13 | 13 |
| DPG (6) | 2.5 | 2.5 | 2.5 | 2.5 | 2.5 | 2.5 | 2.5 |
| Stearic acid (7) | 3 | 3 | 3 | 3 | 3 | 3 | 3 |
| ZnO (8) | 0.9 | 0.9 | 0.9 | 0.9 | 0.9 | 0.9 | 0.9 |
| Accelerator (9) | 2.3 | 2.3 | 2.3 | 2.3 | 2.3 | 2.3 | 2.3 |
| Soluble sulfur | 0.7 | 0.7 | 0.7 | 0.7 | 0.7 | 0.7 | 0.7 |

(1) SBR of Tg = −88° C. of example 3
(2) Carbon black, ASTM N234 grade
(3) Silica, "Zeosil 1165 MP" from Solvay, HDS type
(4) N-(1,3-Dimethylbutyl)-N'-phenyl-p-phenylenediamine ("Santoflex 6-PPD") from Flexsys and 2,2,4-trimethyl-1,2-dihydroquinoline (TMQ)
(5) Coupling agent: "Si69" from Evonik-Degussa
(6) Diphenylguanidine, "Perkacit DPG" from Flexsys
(7) Stearin, "Pristerene 4931" from Uniqema
(8) Zinc oxide, industrial grade-Umicore
(9) N-Cyclohexyl-2-benzothiazolesulfenamide ("Santocure CBS" from Flexsys)

TABLE 5

Rubber Composition Properties

|  | T1 | T2 | C1 | C2 | C3 | C4 | C5 |
| --- | --- | --- | --- | --- | --- | --- | --- |
| G* 10% at 23° C. (base 100) | 100% | 84% | 119% | 168% | 318% | 240% | 177% |
| G* 10% at 40° C. (base 100) | 100% | 103% | 109% | 119% | 141% | 130% | 123% |

Relative to the control compositions, it is noted that the composition T1, which is not in accordance with hydrocarbon resins described herein, serves as base 100 for comparing the performance of the other compositions. It is noted that only the compositions C1 to C5 enable more than 10% improvement in road handling performance.

The invention claimed is:
1. A tire comprising a rubber composition based on at least:
an elastomer matrix comprising from 50 to 100 phr of one or more copolymers of butadiene and of vinylaromatic monomer, having a content of vinylaromatic units of between 0 and 5% by weight and a Tg within a range extending from −110° C. to −70° C.; and
a hydrocarbon resin,
wherein the hydrocarbon resin is based on a cyclic monomer selected from the group consisting of a distillation cut from a petroleum refinery stream, $C_4$, $C_5$ or $C_6$ cyclic olefins and mixtures thereof,
wherein the hydrocarbon resin has a content of aromatic protons (H Ar, expressed in mol %), a glass transition temperature (Tg, expressed in ° C.), and a number average molecular weight (Mn, expressed in g/mol) that are represented by:

$$HAr > 6 \text{ mol \%}, \quad (1)$$

$$Tg \geq 95 - 2.2*(HAr), \quad (2)$$

and $$Tg \geq -53 + (0.265*Mn), \quad (3)$$

wherein a content of the hydrocarbon resin is within a range extending from 65 to 110 phr.
2. The tire according to claim 1, wherein the hydrocarbon resin comprises methylcyclopentadiene in an amount between 0.1 wt. % and 15 wt. %.

3. The tire according to claim 1, wherein the hydrocarbon resin has at least one of the following additional features:
a MMAP cloud point of between 10° C. and 60° C.;
a number average molecular weight (Mn) of between 150 and 800 g/mol;
a glass transition temperature (Tg) represented by Tg≥100−2.2*(H Ar);
a glass transition temperature (Tg) represented by Tg≥−32+(0.265*Mn); and
an aromatic proton content (H Ar) of greater than 6 mol % and less than 25 mol %.

4. The tire according to claim 1, wherein a content of the hydrocarbon resin is within a range extending from 15 to 150 phr.

5. The tire according to claim 1, wherein each copolymer of butadiene and of vinylaromatic monomer has a Tg within a range extending from −110° C. to −80° C.

6. The tire according to claim 1, wherein each copolymer of butadiene and of vinylaromatic monomer has a content of vinylaromatic units of 1 to 4% by weight relative to the total weight of the copolymer, and also a content of vinylaromatic units, relative to the diene portion, ranging from 8 to 15% by weight.

7. The tire according to claim 1, wherein the rubber composition further comprises a reinforcing filler.

8. The tire according to claim 1, wherein the hydrocarbon resin comprises the cyclic monomer in an amount between 10 wt. % and 90 wt. %.

9. The tire according to claim 8, wherein the cyclic monomer is selected from the group consisting of cyclopentene, cyclopentadiene, dicyclopentadiene, cyclohexene, 1,3-cyclohexadiene, 1,4-cyclohexadiene, methylcyclopentadiene, di(methylcyclopentadiene) and mixtures thereof.

10. The tire according to claim 1, wherein at least 70% by weight of the one or more copolymers of butadiene and of vinylaromatic monomer is functionalized.

11. The tire according to claim 10, wherein each copolymer of butadiene and of vinylaromatic monomer comprises more than 0 and up to 30% by weight, relative to a total weight of the copolymer of butadiene and of vinylaromatic monomer, of a star-branched copolymer of butadiene and of vinylaromatic monomer.

12. The tire according to claim 1, wherein the hydrocarbon resin is further based on an aromatic monomer.

13. The tire according to claim 12, wherein the aromatic monomer is selected from the group consisting of olefin-aromatic compounds, aromatic distillation cuts and mixtures thereof.

14. The tire according to claim 13, wherein the aromatic monomer is an aromatic distillation cut or an olefin-aromatic compound selected from the group consisting of indene derivatives, vinylaromatic compounds and mixtures thereof.

15. The tire according to claim 14, wherein the aromatic monomer comprises an indene derivative of Formula (I)

wherein $R_1$ and $R_2$ represent, independently of one another, a hydrogen atom, an alkyl group, an alkenyl group, a cycloalkyl group, an aryl group or an arylalkyl group, or a vinylaromatic compound of Formula (II)

wherein $R_3$ and $R_4$ represent, independently of one another, a hydrogen atom, an alkyl group, an alkenyl group, a cycloalkyl group, an aryl group or an arylalkyl group.

* * * * *